Aug. 19, 1941.   R. T. SCHELL   2,252,949
MINNOW NET
Filed April 26, 1941

INVENTOR
Robert Thomas Schell
By Frederick E. Bromley
Atty.

Patented Aug. 19, 1941

2,252,949

UNITED STATES PATENT OFFICE 2,252,949

MINNOW NET

Robert Thomas Schell, Barlochan, Ontario, Canada

Application April 26, 1941, Serial No. 390,518
In Canada May 15, 1940

5 Claims. (Cl. 43—7)

My invention has for its primary object the provision of a net for catching minnows in comparatively deep water. The ordinary flat net commonly used for catching minnows in shallow water is of little avail in several feet of water because the fish, as a rule, can readily escape in lifting the net to the surface no matter how quickly the lifting is done. Additionally, it is especially difficult to catch minnows in places where catfish abound, as most fishermen know.

The invention has for a secondary object the provision of a net for sucker fishing, and generally to produce a more efficient and serviceable device of this nature having salient features of construction.

The invention comprehends a net comprising a fairly deep container or trap of a collapsible nature attached to a rope or like flexible element by means of which it may be lowered over the side of a boat or dock into the water so as to come to rest upon the floor of the water in a collapsed condition. A marline is preferably employed to attach the rope to the top of the container and a buoyant device such as a cork is supplied at the rope juncture to keep the marline taut. When fish gather at the mouth of the container or trap it is raised abruptly by manually pulling on the rope, which causes the container or trap to unfold and encompass the fish as it is hauled to the surface.

The container or trap is a cylindrical member composed of reticulate side and bottom walls of pliant material attached to annular ribs of resilient material arranged in spaced relation whereby the side wall may collapse. Desirably the container or trap is also designed to fold diametrically when not in use so that it may be stored in little space. This is accomplished by constructing each rib of two spring-steel rods bowed inwardly in semi-circular fashion with their meeting ends swivelly connected and supplied with a latching arrangement that retains them in circular formation. By disconnection of the latching arrangement the resiliency of the components of the ribs causes opposite sides of the container to collapse and lie substantially flat, in which condition the device occupies but little space. Hence it may be conveniently stored.

Referring to the accompanying drawing.

Like numerals of reference denote similar parts in each figure of the drawing.

Figure 1:
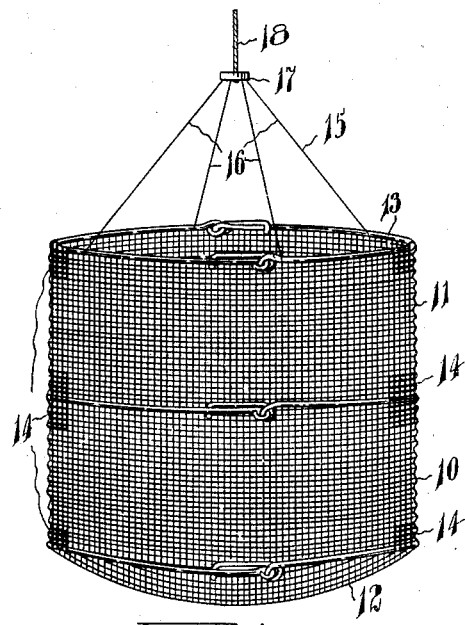
Fig. 1 is a side view of the net.
Figure 4:
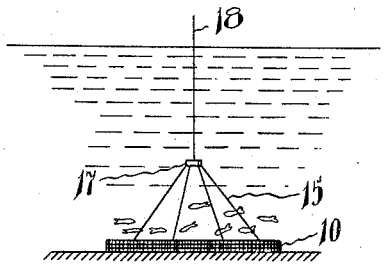
Fig. 4 illustrates the net collapsed in a body of water.
Figure 2:
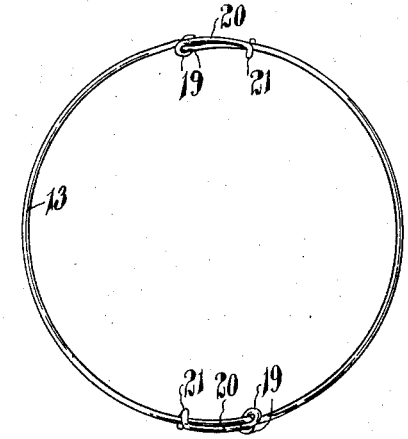
Fig. 2 is a plan of one of the ribs illustrating the manner in which the sections thereof are interlocked when circumflexed to form an annular member.
Figure 5:
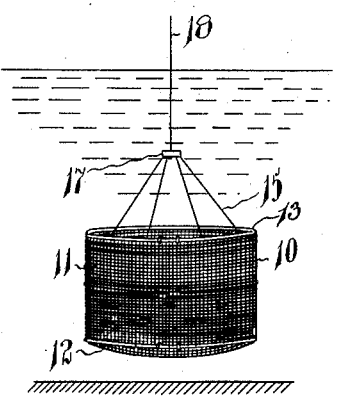
Fig. 5 depicts the net being hauled to the surface with the catch.

The practical embodiment of the invention illustrated in the drawing comprises a net having a body, generally indicated at 10, in the form of a collapsible container or trap of a cylindrical shape. For the purpose of catching minnows the body is made about thirty inches in diameter and about twenty-four inches in depth.

The side wall 11 and the bottom 12 are formed of such material as minnow netting, which is attached to the supporting ribs 13 composing the framework. The ribs are annular members and preferably three in number, the intermediate one being spaced equidistantly from the upper and lower ones. The top rib forms the mouth of the body which is entirely open. The netting that forms the bottom 12 sags from the bottom rib so that there will be a sufficient stretch of material to allow opposite sides of the body to flatten out against each other when the ribs are unfolded to store the net. The netting that composes the side wall 11 extends in substantially taut condition insofar as the girth of the body is concerned.

Figure 6:
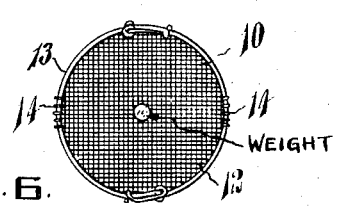
Fig. 6 is a plan view of Fig. 1 omitting the marline.
Figure 3:
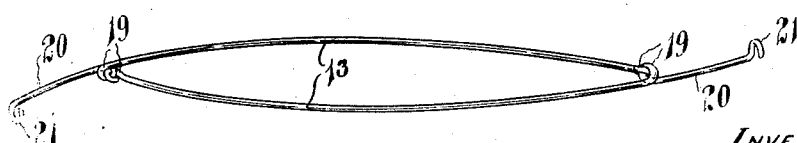
Fig. 3 is a plan view showing the rib collapsed.

Any suitable expedient may be resorted to for the purpose of attaching the netting to the ribs. For instance, I find that by sewing or otherwise attaching separate pieces of mesh material, denoted at 14, to the netting of the side walls 11 in a manner to provide loops through which the ribs are threaded, a satisfactory attachment means is produced. The mesh material 14 is depicted in Figs. 1 and 6. The latter figure shows strands of the material looped around the rib-sections. If desirable the pieces 14 may be bands co-extensive with the ribs. The loops accommodate folding of the ribs in collapsing the net body for storage purposes, and may be likened to the loops on window curtains in which a rod is threaded.

According to this construction, it will be manifest that the body is capable of collapsing in bellows fashion between the top and the bottom ribs so that the several ribs rest one on another. When the body is resting on a supporting surface this collapsed condition obtains. To distend the body it is necessary to support it by the top rib, for which purpose a marline 15 is supplied and composed of several flexible strands 16 secured at intervals around the top rib and converged centrally thereabove. The strands are fastened to a buoyant device 17 such as a cork, from which a flexible element 18 extends and is of a suitable length for lowering and raising the body. Element 18 is an ordinary rope.

In the use of the net it is baited preparatory to being lowered into the water. The bait is simply placed in the container or trap. Oatmeal or bread wetted in the hand provides an attractive lure for minnows. A weight of a size sufficient to assist the sinking of the container or trap with the paying out of the rope 18 is disposed loosely on the bottom 12 or otherwise arranged. As the container or trap comes to rest on the floor of the body of water it assumes a collapsed condition with the marline held taut by the buoyant device 17. When minnows gather over the mouth the trap is raised suddenly to ensnare the catch and is brought to the surface. In the event of catfish inhabiting the area in which the net is lowered the trap may be slightly elevated so that the minnows running high may gather at the mouth and be caught without entrapping the low-running catfish.

To provide for compactly storing the net when not required, the ribs are each formed of two similar lengths of straight spring steel bowed oppositely with mating ends secured in a manner to preclude complementary sections from straightening out to a relaxed condition. To this end the semi-circular sections are fashioned with interfitting eyes 19 to form a hinge connection, and an end of one section is prolonged beyond its eye part at one side of the eye to form an arm 20 that terminates in a latch 21 having a hook relation with the other section. Likewise the other section is prolonged beyond its eye portion at the diametrically opposite side to form a similar arm which also terminates in a latch having a hook relation with the mating section. The eyes 19 of the several ribs have positional correspondence at the opposite sides of the body.

To collapse the trap body from its cylindrical configuration into a substantially flat member, the arms 20 are unlatched so that the sections of the ribs may straighten under the influence of the resiliency of the spring material. The net may then be compactly folded. To assure of the component sections of the bottom rib being free to unfold it is necessary that the netting at the bottom be sufficiently loose or baggy for this purpose.

The invention is inexpensive to manufacture and enables a supply of minnows to be caught for use as fresh bait on fishing trips.

What I claim is:

1. In a net of the class described, a cylindrical body comprising a pliant netting forming the side and bottom walls thereof, and annular ribs about the side wall in spaced relation and attached to the netting, the said ribs being characterized in that they are each composed of resilient sections circumflexed from a relaxed linear condition to conjointly form an annulus, the meeting ends of the sections having eye portions by which they are hingedly connected, and latch means being provided whereby the component sections are maintained in a circumflexed condition.

2. A structure in accordance with claim 1 and in which the latch means consists of an arm projecting forwardly from the eye portion of one section and having a hook engaged with an adjacent extent of the mating section.

3. In a net of the class described, a cylindrical container or trap comprised of recticulate side and bottom walls of pliant material, a series of annular ribs attached to the pliant material and arranged one above another, said ribs each being constructed of a pair of normally straight rods of resilient material bowed into semi-circular configuration to conjointly form a circle, the meeting ends of the rods at diametrically opposite sides of the container or trap being interlocked by a latching arrangement that maintains the rods in semi-circular shape and also enables them to be released for relaxing to collapse the container or trap for folding compactly when not in use.

4. In a net of the class described, a cylindrical container or trap comprised of reticulate side and bottom walls of pliant material, a series of annular ribs attached to the pliant material and arranged one above another, said ribs each being constructed of a pair of normally straight rods of resilient material bowed into semi-circular configuration to conjointly form a circle, the meeting ends of the rods at diametrically opposite sides of the container or trap being fashioned with interlocked eyes forming a hinge connection, one of the rods of the meeting ends being prolonged beyond its eye portion coextensively with the mating end of the companion rod and terminating in a hook engaged with the companion rod whereby the companion rods of the rib are maintained in semi-circular configuration and are capable of being released to enable them to relax into substantially straight rods for compactly folding the container or trap when not in use.

5. In a net of the class described having reticulate walls of pliant material, a series of supporting ribs therefor, each rib being composed of two resilient wire rods circumflexed from a relaxed linear condition into a semi-circular configuration to conjointly form an annulus, the meeting ends at opposite sides of the annulus being fashioned with eyes interlocked to compose a hinge connection which enables the rods to collapse in the plane of the rib, one of the rods having a portion of its length extending beyond the hinge connection at one side of the rib to form an arm bent at its extremity into a hook engaged with the other rod to maintain the rib in bowed condition, and the other rod having a portion of its length extending beyond the hinge connection at the opposite side of the rib to form an arm bent at its extremity into a hook engaged with the companion rod to co-operate in maintaining the rib in bowed condition.

ROBERT THOMAS SCHELL.